Figure 2:
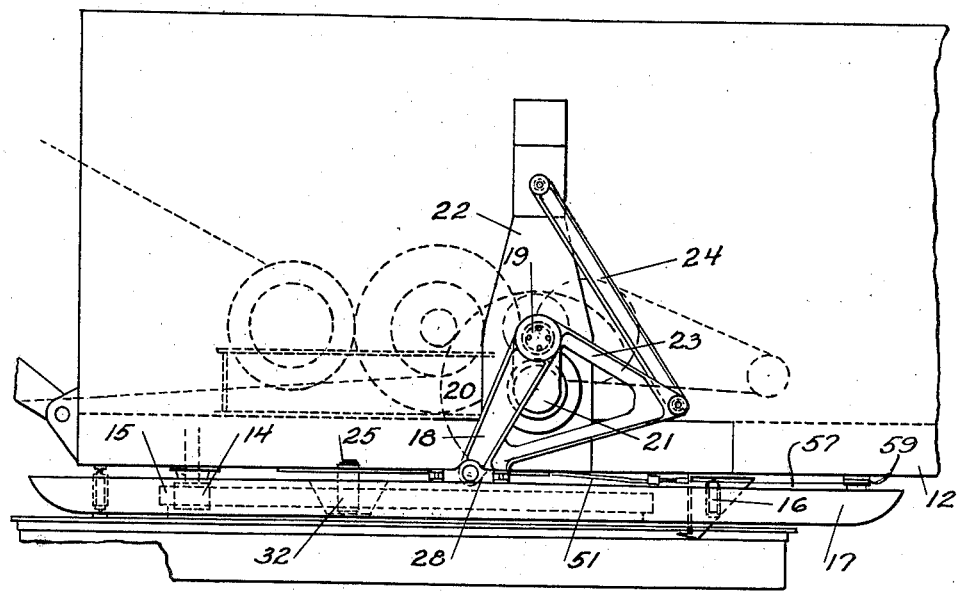

April 30, 1946.  E. C. WILSON ET AL  2,399,417
WALKING TRACTOR
Filed Oct. 18, 1943  4 Sheets-Sheet 1
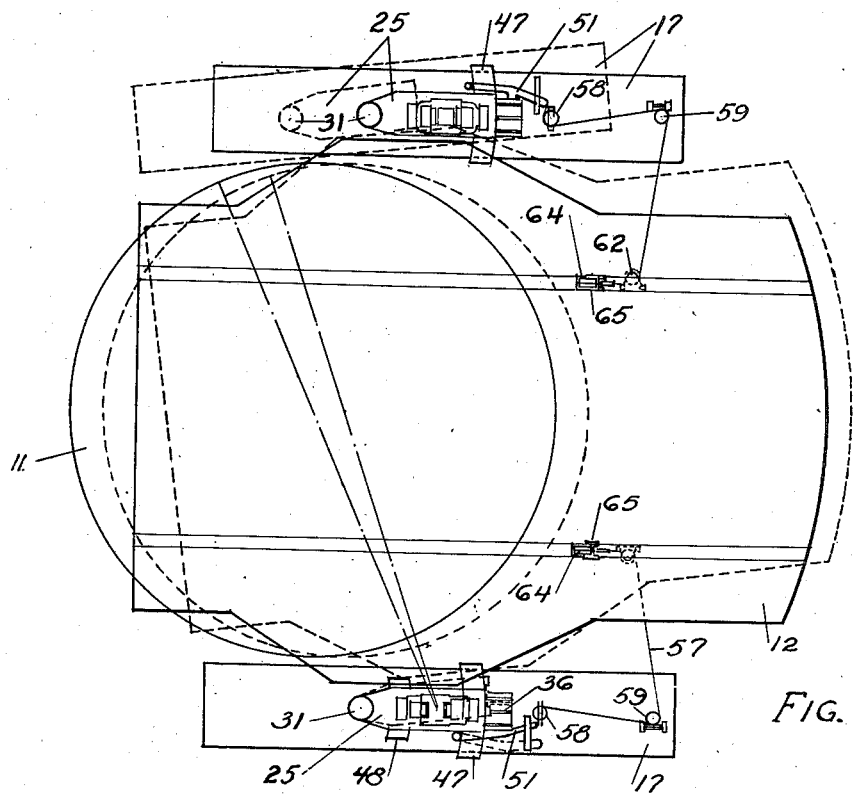
FIG. 1
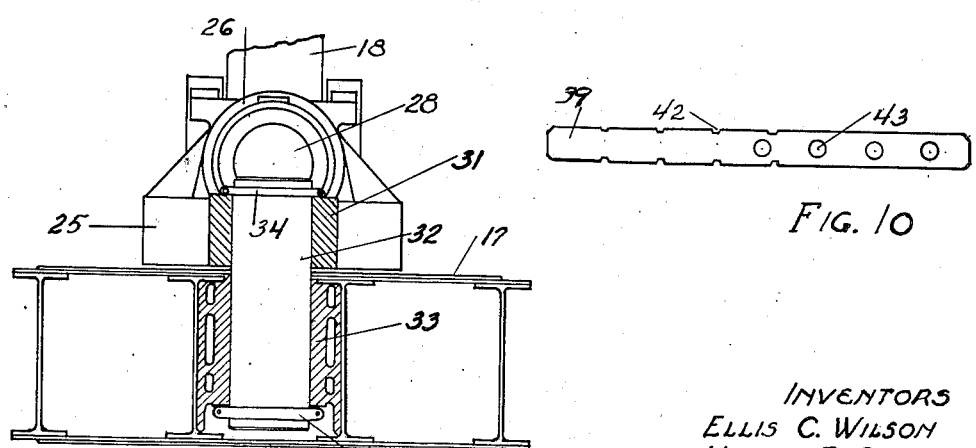
FIG. 9
FIG. 10
INVENTORS
ELLIS C. WILSON
HARRY F. STOCK
GLEN B. HEFFELFINGER
By
ATTORNEY April 30, 1946. E. C. WILSON ET AL 2,399,417
WALKING TRACTOR
Filed Oct. 18, 1943 4 Sheets-Sheet 2

INVENTORS
ELLIS C. WILSON
HARRY F. STOCK
GLEN B. HEFFELFINGER
By
ATTORNEY

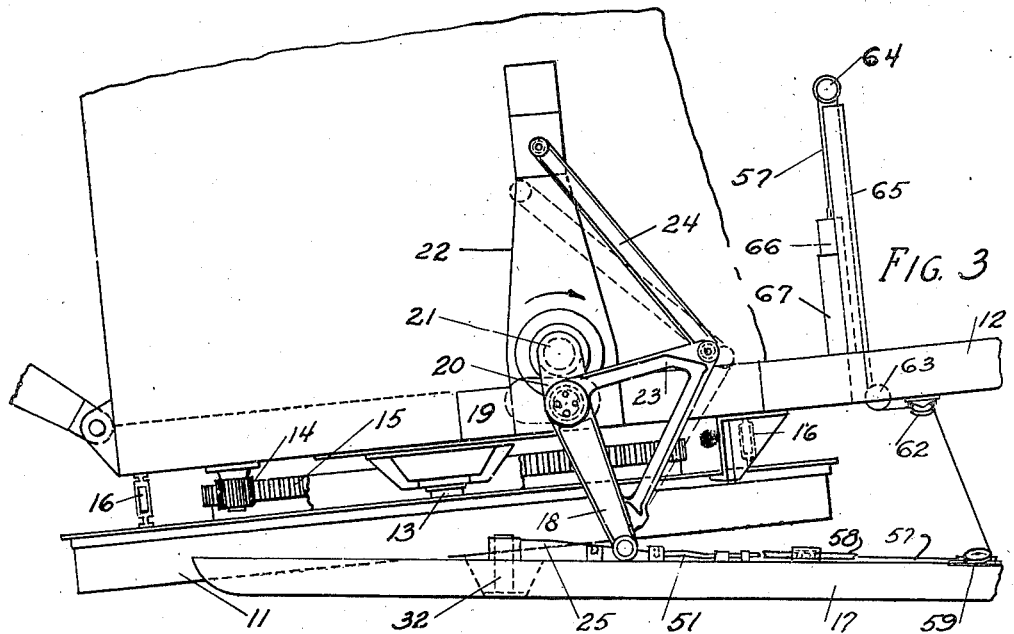
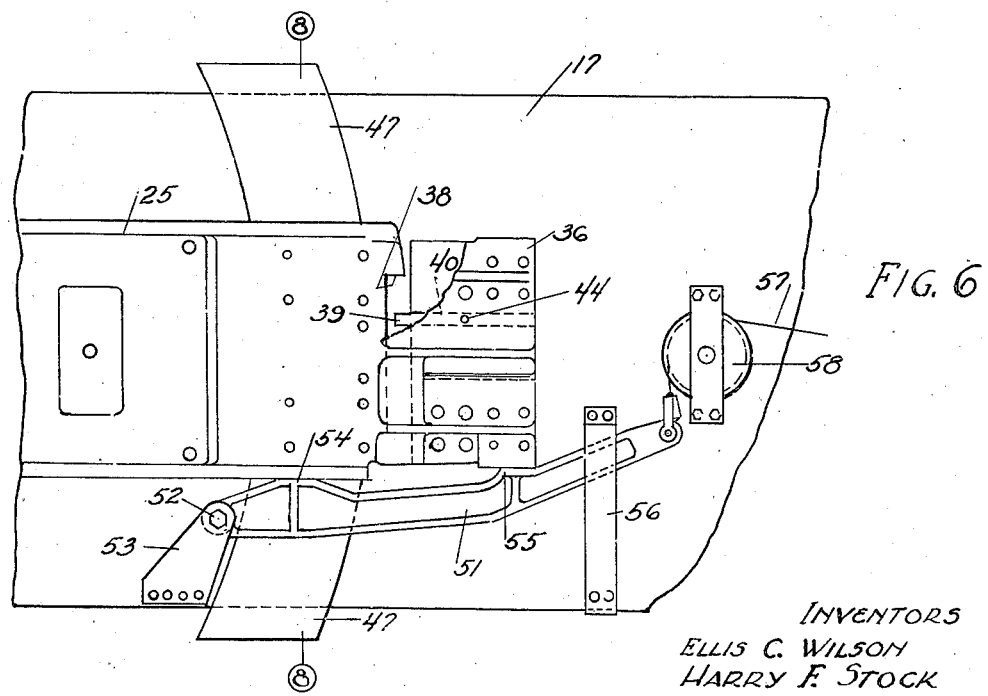

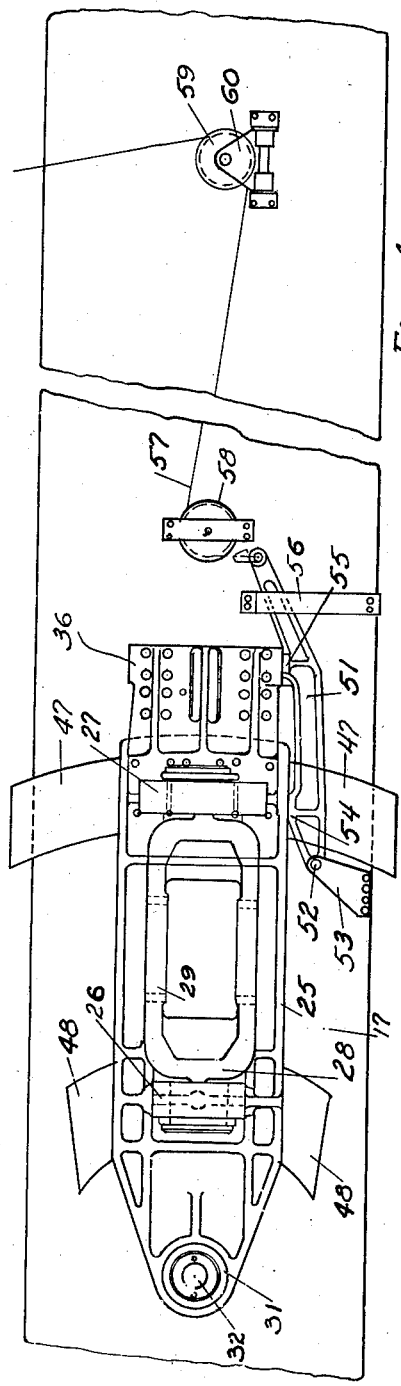
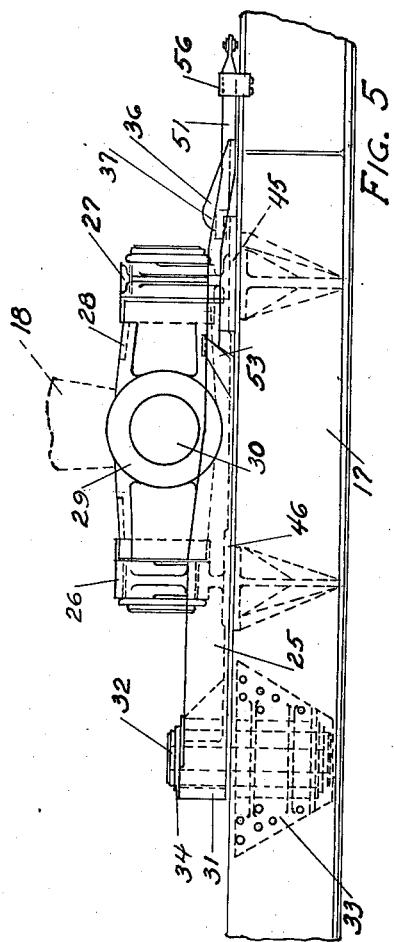

Patented Apr. 30, 1946

2,399,417

UNITED STATES PATENT OFFICE 2,399,417

WALKING TRACTOR

Ellis C. Wilson, Harry F. Stock, and Glen B. Heffelfinger, Marion, Ohio, assignors to The Marion Steam Shovel Company, Marion, Ohio, a corporation of Ohio Application October 18, 1943, Serial No. 506,688

37 Claims. (Cl. 180—8)

This invention relates to a self-propelled machine of the type commonly called a walking tractor and which is designed primarily for walking over uneven and very soft ground and is usually employed to support excavating mechanism. The machine comprises a base, usually circular and of large diameter, on which is rotatably supported a platform which carries the power plant, propelling mechanism and excavating mechanism. The base normally rests upon the ground and is so connected with the platform that it will move therewith when the platform is moved vertically. Supported by the platform on the respective sides thereof are treads or shoes by means of which the machine is propelled from one position to another. Suitable mechanism on the platform moves the treads simultaneously to elevated positions, then forwardly with relation to the base and platform and downwardly into engagement with the ground. The continued operation of the mechanism then lifts the platform and base until at least the forward edge of the base is substantially clear of the ground and moves the same forwardly with relation to the treads and then lowers the base onto the ground in its advanced position. The treads are then again elevated and the cycle of operations is repeated until the machine is moved to the desired location.

In operating such a machine it is often necessary to propel the same over ground so uneven or so soft as to set up unequal bearing values in the treads and impose severe strains on the operating devices and the connections between the same and the treads. When the machine is propelled over swampy ground the condition of the ground at opposite sides of the machine may be such that one tread will have better support and higher bearing value than the opposite tread and the latter will slip and move laterally and cause the machine to rotate about a vertical axis during its forward movement. The tread having the better support will have less movement or tend to move more slowly than the opposite tread and the device for operating it will be subjected to severe torsional and bending strains which may seriously injure or destroy the same. If the ground over which the machine is moving is uneven and the surface at one side of the machine slopes downwardly away from the base the tread adjacent said sloping surface may fail to engage the ground during the forward movement of the machine while the opposite tread is in supporting engagement with the ground. When this condition exists the propelling force exerted on the supported tread will lift the adjacent side of the base and move the same forwardly and the opposite side of the base will form a pivot point on the ground about which the machine will rotate, thus tending to move the operating device for the supported tread laterally with relation to said tread and subjecting the operating device and its connections with the tread to severe torsional and bending strains.

One object of the invention is to eliminate the strains on the operating device and its connections with the tread when the machine moves, or tends to move, laterally while the tread is in supporting engagement with the ground.

A further object of the invention is to provide connections between the operating devices and the treads of such a character that the operating devices may have lateral movement with relation to the treads without impairing the propelling function thereof.

A further object of the invention is to provide means whereby the operating devices may be connected with the treads for lateral movement with relation thereto without material modification of the construction or operation of the operating mechanism.

A further object of the invention is to provide such connecting means which will automatically reestablish the normal relation between the operating device and the tread when the latter is moved out of engagement with the ground.

A further object of the invention is to provide such a device which will be simple in construction and operation and of a strong durable character.

Other objects of the invention may appear as the mechanism is described in detail.

Figure 7:
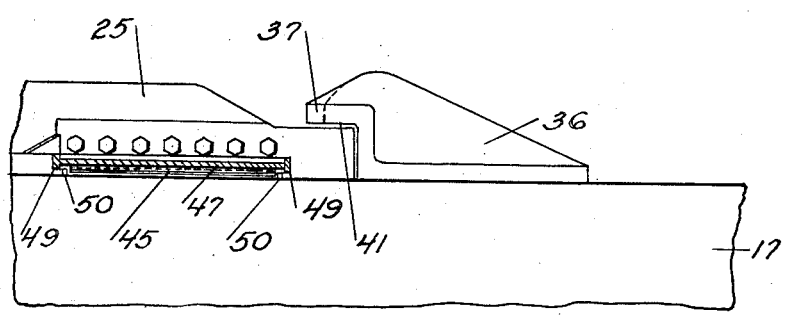
Figure 8:
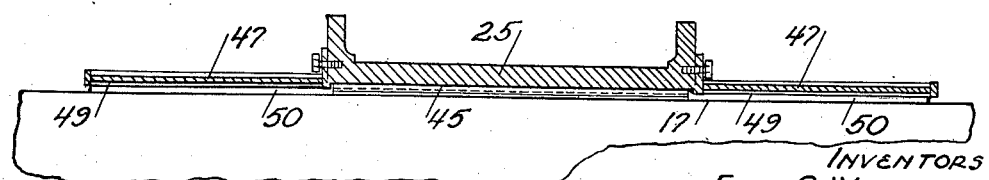

In the accompanying drawings Fig. 1 is a plan view of a walking tractor equipped with the invention, the various mechanisms ordinarily supported by the platform having been omitted; Fig. 2 is a side elevation of such a machine with the base and platform in their normal working positions; Fig. 3 is a side elevation of such a machine showing the positions of the base and platform at the beginning of the forward movement thereof; Fig. 4 is a top plan view of the laterally movable member for connecting the operating device with the tread; Fig. 5 is a side elevation of the laterally movable member; Fig. 6 is an enlarged view of the forward end of the laterally movable member and its keeper, with the bearings removed and the keeper partly broken away; Fig. 7 is a side elevation of the forward end of the laterally movable member and its keeper showing the guard for the bearing surface; Fig. 8 is a transverse section taken on the line 8—8 of Fig. 6; Fig. 9 is a sectional detail view of the vertical bearing for the laterally movable member; and Fig. 10 is a detail view of the stop bar.

In these drawings we have illustrated one embodiment of our invention and have shown the same as applied to a large capacity dragline excavator of the type shown and described in the Stock Patent No. 2,179,765, granted November 14, 1939; but it is to be understood that the invention may take various forms and may be applied to walking tractors or other similar machines of various kinds.

In the illustrated embodiment the machine comprises a main or supporting structure which preferably includes a circular base 11 of large diameter on which is rotatably mounted a platform 12 which carries the excavating and propelling mechanisms and forms part of a cab in which the driving and controlling mechanisms are enclosed. The platform is rotated about a center pin 13 by a pinion 14 which meshes with a gear 15 on the base and is driven by mechanism on the platform, which holds the platform against rotation on the base during the propelling operation, lateral support being provided by rollers 16 mounted between tracks on the base and platform. The connection between the base and the platform is such as to prevent relative vertical movement thereof and thus cause the base to move with the platform when the latter is moved upwardly and forwardly by the walking mechanism. Elongate treads or shoes 17 are arranged at the respective sides of the supporting structure, that is, the base and the platform, and mechanism carried by the platform alternately advances the treads and the supporting structure so as to propel the machine as a whole step by step.

The mechanism for so propelling the machine comprises separate operating devices for the respective treads, the two operating devices being actuated in unison by driving mechanism on the platform. The operating devices may be of any suitable character and in the illustrated machine they are of the type shown in the above mentioned patent. Each such operating device includes a lever, or walking arm, 18 pivotally connected at its lower end with one of the treads 17 and journaled at its upper end on a wrist pin 19 carried by a crank arm 20 which is rigidly secured to a driving shaft 21 on the platform, and the crank arms of both operating devices being secured to the same shaft. The shaft 21 may be an integral structure or may comprise a plurality of connected sections and the end portions thereof are journaled in upright frame members 22 rigidly mounted on the platform. Rigidly connected with and extending forwardly from each lever 18 is an arm 23, the forward end of which is pivotally connected with one end of a link 24, the other end of the link being pivotally connected with the adjacent upright frame member 22 at a point spaced a substantial distance above the shaft. When the machine is in its normal, or excavating, position, with the base in supporting engagement with the ground, the cranks 20 extend upwardly from the shaft and support the treads in elevated positions. The cranks rotate clockwise, as shown in Fig. 2, and the forward movement of the cranks from said upwardly extending positions moves the upper ends of the levers 18 forwardly and downwardly and the links 24 cause the levers to rotate on the wrist pins 19 in a counterclockwise direction, thus swinging the lower ends of the levers forwardly and advancing the treads with relation to the base and platform and lowering the same into engagement with the ground. The treads being thus prevented from further downward movement the further rotation of the cranks causes the levers to fulcrum on the treads and lift the platform to move the forward edge of the base out of engagement with the ground, as shown in Fig. 3, and to then move the platform and base forwardly with relation to the treads and lower the same onto the ground in an advanced position. When the base is again supported on the ground the levers fulcrum on the wrist pins to again move the treads to their elevated positions, and the cycle of operations is repeated as often as may be necessary to propel the machine to the desired location.

As has been above explained, the unevenness or softness of the ground over which the machine is being propelled may set up unequal bearing values in the treads so that one tread may have inadequate support, or no support, while the opposite tread is more or less firmly supported on the ground. Due to the unequal bearing values of the treads the propelling force exerted on the more firmly supported tread tends to, and often does, cause the machine to rotate about a vertical axis as it moves forwardly, thus moving the operating devices, and more particularly the operating device for the more firmly supported tread, laterally with relation to the treads. This movement of the operating device with relation to its tread subjects the operating device and its pivotal connections with the tread to severe torsional and bending strains which may distort or destroy the same. This condition exists in all machines of this general type regardless of size but is particularly serious in machines of great weight, and it may be noted that the machine here illustrated is equipped with a twenty-five yard dragline dipper and a one hundred and eighty foot boom and has a working weight of approximately two and one-half million pounds.

To avoid subjecting the mechanism to these serious strains we have provided a yieldable connection between the supporting structure and the tread which permits the supporting structure to move laterally with relation to the tread, and restores the tread to its normal position with relation to the supporting structure when the tread is moved out of engagement with the ground and is thus released for lateral movement. In the present machine the yieldable connection is interposed between the operating device and the tread and comprises a member mounted on the tread for lateral movement with relation thereto and pivotally connected to the lower end of the operating device, and means for automatically moving the tread to its normal position with relation to said member when the tread is disengaged from the ground.

In the particular construction here illustrated an elongate member 25, preferably a casting, is pivotally mounted on each tread 17 for lateral movement with relation thereto and is held against vertical or longitudinal movement with relation thereto, and the lever 18 of the corresponding operating device is pivotally connected with a laterally movable part of the pivoted member. It is desirable that the tread shall be movable with relation to the lever about a longitudinal axis as well as about a transverse axis, to enable it to accommodate itself to an uneven surface of the ground. Therefore alined bearings 26 and 27 are rigidly secured to an intermediate portion of the pivoted member 25 in longitudinally spaced positions thereon. A trunnion member 28 is journaled at its ends in the respective bearings 26 and 27 and is provided between its ends with transversely alined horizontal bearings 29 between which the lower end of the lever 18 extends, the lever being connected with the bearings by a pivot pin 30. At least one of the longitudinal bearings, in the present instance the bearing 27, is removably mounted on the pivoted member 25 to permit the assembly of the unit without the use of divided bearings.

The pivoted member 25 is provided near its rear end with a vertical bearing 31, see Fig. 9, to receive a vertical pivot pin 32, the lower portion of which extends into the tread 17 and is mounted in a suitable support, such as a casting 33, rigidly mounted between the upper and lower walls of the tread. The bearing 31 of the pivoted member is held against vertical movement with relation to the pivot pin 32 by a collar 34 rigidly but removably secured to the pin, and the pivot pin is held against vertical movement with relation to the tread by a similar collar 35 rigidly but removably secured to the lower end thereof and engaging the lower end of the casting 33.

When all or the major part of the propelling force is exerted on one only of the treads and the base or platform moves about a substantially vertical axis adjacent that side of the base which is opposite the effective tread, the driving shaft and the wrist pin 19 on which the walking arm or lever 18 associated with that tread is mounted will move with the platform about said axis, and the pivoted connecting member 25 on the effective tread will be moved laterally with relation to the tread, the lower end of the lever moving about the axis of the connecting member in an arc of relatively short radius. To prevent binding between relatively movable parts, and the resultant severe wear on or breakage of said parts, it is important that the radius of the arc in which the lower end of the lever moves shall be such that, in all positions of the connecting member with relation to the tread, the transverse axis 30 of the connection between the lever and the trunnion member 28 will be parallel with the axis of the wrist pin, and the longitudinal axis of the trunnion member will be at right angles to the axis of the wrist pin. The distance between said transverse axis 30 and the vertical axis 32 of the connecting member necessary to accomplish this result is accurately predetermined with relation to the size of the machine and the dimensions of the connected parts.

The forward end of the pivoted member 25 is held against vertical movement with relation to the tread by means of a keeper or retaining member 36 which is here shown as a casting rigidly secured to the tread beyond the forward end of the pivoted member and provided with a rearwardly extending portion or lip 37 which overhangs the forward end of the pivoted member, the forward edge of the pivoted member being curved about the pivotal axis thereof to permit of its free pivotal movement with relation to the retaining member. This forward end of the pivoted member is recessed to provide the same adjacent each side thereof with a shoulder 38 and the retaining member is provided with a part extending into said recess in the path of the shoulders 38 and forming a stop to limit the pivotal movement of the pivoted member. Preferably this stop is of such a strength that it will break and permit the continued movement of the pivoted member when the force exerted upon the latter exceeds a predetermined amount. In the present instance the stop is in the form of an elongate bar 39 which is mounted in a channel 40 in the lower surface of the retaining member 36 and projects beyond the vertical face 41 of the retaining member into the recess 38 in the pivoted member. The bar 39 is weakened at the point where it leaves the channel 40 to enable it to be broken under excessive force and preferably the bar is of substantial length and is provided in its lateral edges with weakening notches 42 spaced apart lengthwise thereof. It is also provided with a series of holes 43 any one of which may be moved to a position to be engaged by a pin 44 extending through the upper part of the retaining member. Thus when the projecting end portion of the bar has been broken off the pin 44 may be removed and the bar advanced to project another weakened section thereof into the recess 38.

Mounted in the pivoted member 25 and projecting below the lower surface thereof are bearing plates 45 and 46 which move over finished surfaces on the tread. To protect these bearing surfaces from dirt and to facilitate the lubrication thereof a pair of guards 47 and 48 are secured to the pivoted member 25 for movement therewith and are so arranged that when the pivoted member has been moved from its normal position the guards will be located above the bearing surfaces uncovered by the movement of the pivoted member. Inasmuch as the pivoted member 25 may be moved in either direction from its normal position guards 47 and 48 are arranged on opposite sides of the same adjacent each bearing plate, these guards being preferably curved about the pivotal axis of the member 25. Each plate, as shown in Fig. 7, is provided at its front and rear edges with downwardly extending flanges 49 which are spaced apart a distance greater than the width of the respective bearing plates 45 and 46 and which have their lower edges close to but preferably out of engagement with the tread 17. Secured to the tread are parallel bars or ribs 50 which are arranged on the inner sides of and close to the respective flanges 49. This arrangement of the guards not only effectively excludes dirt from the bearing surfaces but also serves to retain a lubricant on the bearing surfaces.

It will be apparent therefore that when the supporting structure, or platform, moves laterally with relation to one of the treads, either by rotating about a vertical axis or otherwise, the operating device for that tread will move with the platform and the pivoted member 25 will move with the operating device and laterally with respect to the tread, without interfering with the propelling function of that tread. When the forward movement, or step, of the machine has been completed and the base is again supported on the ground the platform and the actuating devices remain in the positions to which they have been moved, and the pivoted member 25 remains in its laterally spaced relation to its tread until the tread is again moved out of engagement with the ground and thus released for lateral movement. Means are provided for then moving the tread laterally into its normal alined position with relation to the pivoted member. A yieldable connection of any suitable kind may be interposed between the tread and the platform to effect the return of the tread to its normal position with relation to its pivoted member. However, inasmuch as the pivoted member may move in either direction with relation to the tread it is desirable that this yieldable connection shall be such as to restore the tread to its proper position with relation to the pivoted member when the latter has been moved in either direction. For this purpose a lever 51 is pivotally mounted on the tread for movement about a vertical axis and is connected through a cable with a counterweight on the platform. As here shown, the lever 51 is supported adjacent its rear end on a pivot pin 52 the lower end of which is mounted in the tread and the upper end of which is mounted in a bracket 53. The lever extends forwardly from its fulcrum beyond the retaining member 36 and is provided adjacent to but spaced forwardly from its pivotal axis with a part 54 adapted to engage the adjacent side of the pivoted member 25, and forwardly from the part 54 is a part 55 arranged to engage the adjacent edge of the retaining member 36. The forward portion of the lever extends forwardly beneath a guide bar 56, and a cable 57 is connected with the forward end of the lever and extends about a sheave 58 mounted on the tread and spaced laterally from the end of the lever, and then about a second sheave 59 mounted on the tread and adjacent the forward end thereof. This second sheave is preferably carried by a bracket 60 which is mounted on the base for movement about a horizontal axis, to permit the sheave to move to an inclined position. The cable extends from the sheave 59 to a sheave 62 mounted on the lower side of the platform 12 and preferably supported for movement about a horizontal axis to accommodate the same to the inclination of the cable as it passes from the tread to the platform, as shown in Fig. 3. From the sheave 62 the cable extends about a vertical sheave 63, thence upwardly through the platform and about a sheave 64 carried by an upright standard 65 mounted on the platform, and then downwardly from the sheave 64 and is connected with a counterweight 66 which is vertically movable in a guide 67 carried by the standard 65. Thus the counterweight is at all times connected with the lever and tends to hold the same in contact with the retaining member 36. If the pivoted member 25 is moved inwardly, that is, toward the inner edge of the tread, the forward end thereof will be moved away from the lever 51 but the latter will be held against displacement by its continued contact with the retaining member 36. When the forward movement of the machine has been completed and the tread moved out of engagement with the ground the counterweight, acting through the lever 51 and the retaining member 36, will move the tread about the pivotal axis 32 of the pivoted member into alinement with the latter, at which time the part 54 of the lever 51 will engage the edge of the pivoted member and prevent the tread from being moved beyond its alined position. If the pivoted member is moved outwardly, that is, away from the inner edge of said tread, its contact with the part 54 of the lever 51 will move the latter outwardly and away from the retaining member 36. Then when the tread is released for lateral movement the lever will fulcrum at 54 on the pivoted member, which is then held against movement, and will act on the tread, through its pivotal connection 52 therewith, to move the latter outwardly into alinement with the tread, at which time the part 55 of the lever will contact with the retaining member and prevent the overmovement of the tread.

While we have shown and described one embodiment of our invention we wish it to be understood that we do not desire to be limited to the details thereof as various modifications may occur to a person skilled in the art.

Having now fully described our invention, what we claim as new and desire to secure by Letters Patent is:

1. A self-propelled machine comprising a supporting structure, treads at the opposite sides of said structure, driving mechanism on said structure, and operating connections between said driving mechanism and the respective treads to actuate the latter to advance said structure step by step, each operating connection including a rigid member connected with said driving mechanism for oscillatory movement thereby, and means for yieldably connecting the lower end of said rigid member with the corresponding tread to enable said supporting structure to move laterally with relation to said tread.

2. A self-propelled machine comprising a supporting structure, treads at the opposite sides of said structure, driving mechanism on said structure, and operating connections between said driving mechanism and the respective treads to actuate the latter to advance said structure step by step, each operating connection including a member mounted on the corresponding tread for lateral movement with relation thereto and held against substantial vertical movement with relation thereto, and a rigid member connected with said driving mechanism for movement thereby and operatively connected with the member on said tread.

3. A self-propelled machine comprising a supporting structure, treads at the opposite sides of said structure, driving mechanism on said structure, and operating connections between said driving mechanism and the respective treads to actuate the latter to advance said structure step by step, each operating connection including a member mounted on the corresponding tread for lateral movement with relation thereto and held against substantial vertical movement with relation thereto, and a rigid member connected with said driving mechanism for movement thereby and operatively connected with said member on said tread, said members being held against relative movement about a vertical axis.

4. In a self-propelled machine comprising a supporting structure, treads at the opposite sides of said structure, operating devices for said treads carried by said structure, and means on said structure for actuating said operating devices to move said treads forwardly with relation to said structure and to then move said structure forwardly with relation to said treads; a connecting device mounted on each tread for movement about a vertical axis, and means spaced from said vertical axis for connecting the corresponding operating device with said connecting device.

5. In a self-propelled machine comprising a supporting structure, treads at the opposite sides of said structure, operating devices for said treads carried by said structure, and means on said structure for actuating said operating devices to move said treads forwardly with relation to said structure and to then move said structure forwardly with relation to said treads; a connecting device mounted on each tread for movement about a vertical axis, means spaced from said vertical axis for connecting the corresponding operating device with said connecting device, and means for yieldably retaining said tread and said connecting device in predetermined relative positions.

6. In a self-propelled machine comprising a base, a platform on said base, treads at the respective sides of said platform, operating devices to move said treads forwardly with relation to said platform and said base into engagement with the ground and to then move said platform and said base upwardly and forwardly with relation to said treads, and means on said platform for actuating said operating devices; a connecting device mounted on each tread for movement with relation thereto about a vertical axis, held against vertical movement with relation to said tread and connected at a point spaced from said axis with one of said operating devices.

7. In a self-propelled machine comprising a base, a platform on said base, treads at the respective sides of said platform, operating devices to move said treads forwardly with relation to said platform and said base into engagement with the ground and to then move said platform and said base upwardly and forwardly with relation to said treads, and means on said platform for actuating said operating devices; means for connecting each operating device with the corresponding tread for lateral movement with relation thereto, and yieldable means to restore said tread to its proper position with relation to said operating device.

8. In a self-propelled machine comprising a base, a platform on said base, treads at the respective sides of said platform, operating devices to move said treads forwardly with relation to said platform and said base into engagement with the ground and to then move said platform and said base upwardly and forwardly with relation to said treads, and means on said platform for actuating said operating devices; means for connecting said operating devices with the respective treads, each connecting means including a member extending lengthwise of the tread, connected between its ends with the corresponding operating device and connected adjacent one end thereof with said tread for movement about a vertical axis with relation thereto, and means for preventing the vertical movement of said member with relation to said tread.

9. In a self-propelled machine comprising a base, a platform on said base, treads at the respective sides of said platform, operating devices to move said treads forwardly with relation to said platform and said base into engagement with the ground and to then move said platform and said base upwardly and forwardly with relation to said treads, and means on said platform for actuating said operating devices; means for connecting each operating device with the corresponding tread for lateral movement with relation thereto, and means controlled by the relative movement of said operating device and said tread to restore said tread to its normal position with relation to said operating device when said tread is released for lateral movement.

10. In a self-propelled machine comprising a base, a platform on said base, treads at the respective sides of said platform, operating devices to move said treads forwardly with relation to said platform and said base into engagement with the ground and to then move said platform and said base upwardly and forwardly with relation to said treads, and means on said platform for actuating said operating devices; means for connecting each operating device with the corresponding tread for lateral movement with relation thereto, and means controlled by the relative movement of said operating device and said tread and including a yieldable connection between said tread and said platform to restore said tread to its normal position with relation to said operating device when said tread is released for lateral movement.

11. In a self-propelled machine comprising a base, a platform on said base, treads at the respective sides of said platform, operating devices to move said treads forwardly with relation to said platform and said base into engagement with the ground and to then move said platform and said base upwardly and forwardly with relation to said treads, and means on said platform for actuating said operating devices; an elongate member extending lengthwise of each tread and operatively connected between its ends with the corresponding operating device, means for connecting the rear end of said member with said tread for movement about a vertical axis and for preventing the upward movement thereof with relation to said tread, and a retaining member secured to said tread and overhanging the forward portion of said elongate member to hold the latter against upward movement with relation to said tread while permitting pivotal movement of said elongate member with relation to said tread.

12. In a self-propelled machine comprising a base, a platform on said base, treads at the respective sides of said platform, operating devices to move said treads forwardly with relation to said platform and said base into engagement with the ground and to then move said platform and said base upwardly and forwardly with relation to said treads, and means on said platform for actuating said operating devices; a connecting device mounted on each tread for movement about a vertical axis, held against vertical movement with relation to said tread and connected at a point spaced from said axis with one of said operating devices, a counterweight on said platform, and a flexible connection between said counterweight and said tread tending to retain the latter in its normal position with relation to said connecting device.

13. In a self-propelled machine comprising a base, a platform mounted on said base, treads at the respective sides of said platform, operating devices carried by said platform to move said treads forwardly with relation to said platform and said base and to then move said platform and said base upwardly and forwardly with relation to said treads, and means on said platform for actuating said operating devices; a member extending lengthwise of each tread, means for pivotally connecting one end of said member with its tread, a second member rigidly secured to said tread to engage the other end of said pivoted member and hold the same against upward movement, means for connecting an intermediate portion of said pivoted member with one of said operating devices, whereby said pivoted member may move with said operating device when said platform moves laterally while said tread is in supporting engagement with said ground, and a yieldable connection between said platform and said tread to restore the latter to its normal position with relation to said operating device when said tread is released for lateral movement.

14. In a self-propelled machine comprising a base, a platform mounted on said base, treads at the respective sides of said platform, operating devices carried by said platform to move said treads forwardly with relation to said platform and said base and to then move said platform and said base upwardly and forwardly with relation to said treads, and means on said platform for actuating said operating devices; a member extending lengthwise of each tread, means for pivotally connecting one end of said member with its tread, a second member rigidly secured to said tread to engage the other end of said pivoted member and hold the latter against upward movement, means for connecting an intermediate portion of said pivoted member with one of said operating devices, whereby said pivoted member may move with said operating device when said platform moves laterally while said tread is in supporting engagement with said ground, means for restoring said tread to its normal position with relation to said pivoted member when said tread has been moved out of engagement with the ground, including a lever pivotally mounted on said tread, and a yieldable connection between the free end of said lever and said platform tending to move said end of said lever toward said platform, said lever having a part to engage said second member and limit the movement of said tread in one direction by said yieldable connection, and a part to engage said pivoted member and limit the movement of said tread in the other direction by said yieldable connection.

15. In a self-propelled machine comprising a base, a platform mounted on said base, treads at the respective sides of said platform, operating devices carried by said platform to move said treads forwardly with relation to said platform and said base and to then move said platform and said base upwardly and forwardly with relation to said treads, and means on said platform for actuating said operating devices; a member extending lengthwise of each tread, means for pivotally connecting one end of said member with its tread, means to prevent the upward movement of said pivoted member with relation to said tread, means for operatively connecting said pivoted member with one of said operating devices, whereby said pivoted member may move with said operating device when said platform moves laterally while said tread is in supporting engagement with said ground, a lever pivotally mounted at one end on said tread, and yieldable means connecting the free end of said lever with said platform, said lever being arranged to engage and to be held against movement by a part fixed with relation to said tread when said pivoted member is moved in one direction, and to move said tread in the direction in which said pivoted member was moved when said tread is released for such movement, said lever also being arranged to be engaged and moved by said pivoted member when the latter moves in the other direction, said pivoted member constituting a fulcrum about which said lever moves to move said tread in the direction in which said pivoted member was moved, when said tread is released for such movement.

16. In a self-propelled machine comprising a base, a platform mounted on said base, treads at the respective sides of said platform, operating devices carried by said platform to move said treads forwardly with relation to said platform and said base and to then move said platform and said base upwardly and forwardly with relation to said treads, and means on said platform for actuating said operating devices; a member extending lengthwise of each tread, pivotally connected with its tread and held against upward movement with relation thereto, means for connecting said pivoted member with one of said operating devices, whereby said pivoted member may move with said operating device when said platform moves laterally while said tread is in supporting engagement with said ground, a lever pivotally mounted at one end on said tread and having longitudinally spaced parts to engage respectively said pivoted member and a part fixed with relation to said tread when said pivoted member is in its normal position with relation to said tread, and a yieldable connection between the free end of said lever and said platform.

17. In a self-propelled machine comprising a base, a platform mounted on said base, treads at the respective sides of said platform, operating devices carried by said platform to move said treads forwardly with relation to said platform and said base and to then move said platform and said base upwardly and forwardly with relation to said treads, and means on said platform for actuating said operating devices; a member extending lengthwise of each tread, means for pivotally connecting one end of said member with its tread, a second member rigidly secured to said tread to engage the other end of said pivoted member to hold the same against upward movement, means for connecting an intermediate portion of said pivoted member with one of said operating devices, whereby said pivoted member may move with said operating device when said platform moves laterally while said tread is in supporting engagement with said ground, a yieldable connection between said platform and said tread to restore the latter to its normal position with relation to said operating device when said tread is released for lateral movement, said pivoted member having adjacent its free end a part forming a stop, and a part carried by said second member and extending into the path of said stop to limit the lateral movement of said pivoted member.

18. In a self-propelled machine comprising a base, a platform mounted on said base, treads at the respective sides of said platform, operating devices carried by said platform to move said treads forwardly with relation to said platform and said base and to then move said platform and said base upwardly and forwardly with relation to said treads, and means on said platform for actuating said operating devices; a member extending lengthwise of each tread, means for pivotally connecting one end portion of said member with its tread, a second member rigidly secured to said tread to engage the other end of said pivoted member to hold the same against upward movement, means for connecting an intermediate portion of said pivoted member with one of said operating devices, whereby said pivoted member may move with said operating device when said platform moves laterally while said tread is in supporting engagement with said ground, a yieldable connection between said platform and said tread to restore the latter to its normal position with relation to said operating device when said tread is released for lateral movement, said pivoted member having adjacent its free end a part forming a stop, said second member having a channel, and a bar mounted in said channel and having one end portion extending into the path of said stop to limit the lateral movement of said pivoted member, said bar being weakened adjacent the end of said channel to permit said end portion to be broken off by excessive pressure thereon.

19. In a self-propelled machine, a platform, a base connected with said platform for upward and forward movement therewith, treads at the respective sides of said base, connecting devices mounted on the respective treads for lateral movement with relation thereto and held against upward movement with relation thereto, operating devices mounted on the respective sides of said platform and each including a lever, means for pivotally connecting said levers with the respective connecting devices on axes transverse to said treads and for preventing the relative movement of said connecting devices and levers about vertical axes, whereby said levers may be moved laterally with relation to said treads, and means on said platform for actuating said operating devices to cause said levers to advance said treads with relation to said platform and said base and to then move said base upwardly and forwardly with relation to said treads.

20. In a self-propelled machine, a platform, a base connected with said platform for upward and forward movement therewith, treads at the respective sides of said base, connecting members mounted on the respective treads for movement with relation thereto about fixed vertical axes and held against upward movement with relation thereto, operating devices mounted on the respective sides of said platform and each including a downwardly extending lever, means for pivotally connecting the lower ends of said levers with the connecting members on the respective treads, whereby said levers may move laterally with relation to said treads, and means on said platform for actuating said operating devices to cause said levers to advance said treads with relation to said platform and said base and to then fulcrum on said treads to move said platform and said base upwardly and forwardly with relation to said treads.

21. In a self-propelled machine, a platform, a base connected with said platform for upward and forward movement therewith, treads at the respective sides of said base, connecting members mounted on the respective treads for movement about fixed vertical axes and held against upward movement with relation thereto, operating devices mounted on the respective sides of said platform and each including a downwardly extending lever, means for pivotally connecting the lower ends of said levers with the connecting members on the respective treads, whereby said levers may move laterally with relation to said treads, means on said platform for actuating said operating devices to cause said levers to advance said treads with relation to said platform and said base and to then fulcrum on said treads to move said platform and said base upwardly and forwardly with relation to said treads, and yieldable connections between said platform and said treads tending to move said treads to and retain the same in their normal positions with relation to said connecting members.

22. In a self-propelled machine comprising a base, a platform on said base, treads at the respective sides of said platform, operating devices to move said treads forwardly with relation to said platform and said base into engagement with the ground and to then move said platform and said base upwardly and forwardly with relation to said treads, means on said platform for actuating said operating devices; a connecting device mounted on each tread for lateral movement with relation thereto, held against vertical movement with relation thereto and connected with one of said operating devices, said connecting device and said tread having cooperating bearing surfaces, and a guard carried by said connecting device and arranged to be moved over that part of the bearing surface of said tread which is uncovered by the lateral movement of said connecting device.

23. In a self-propelled machine comprising a base, a platform on said base, treads at the respective sides of said platform, operating devices to move said treads forwardly with relation to said platform and said base into engagement with the ground and to then move said platform and said base upwardly and forwardly with relation to said treads, and means on said platform for actuating said operating devices; a connecting device mounted on each tread for movement with relation thereto about a vertical axis, held against vertical movement with relation to said tread and connected at a point spaced from said axis with one of said operating devices, a bearing plate interposed between said connecting device and said tread, secured to one of said members and having a bearing surface in sliding engagement with a bearing surface on the other member, and a guard secured to and extending laterally from said connecting device and movable over the bearing surface of said tread as said connecting device moves laterally with relation to said tread.

24. In a self-propelled machine comprising a base, a platform on said base, treads at the respective sides of said platform, operating devices to move said treads forwardly with relation to said platform and said base into engagement with the ground and to then move said platform and said base upwardly and forwardly with relation to said treads, and means on said platform for actuating said operating device; a connecting device mounted on each tread for movement with relation thereto about a vertical axis, held against vertical movement with relation to said tread and connected at a point spaced from said axis with one of said operating devices, a bearing plate interposed between said connecting device and said tread, secured to one of said members and having a bearing surface in sliding engagement with a bearing surface on the other member, and a guard secured to and extending laterally from said connecting device for movement over the bearing surface of said tread as said connecting device moves laterally with relation to said tread, said guard having downwardly extending flanges at the lateral edges thereof, and ribs on said tread parallel with the respective flanges and overlapping the inner surfaces thereof.

25. Walking apparatus for an excavating machine comprising crank arm mechanisms and associated shoes at opposed sides of the machine, load distributing plates secured to said mechanisms and adapted to bear on the upper surfaces of the shoes, and means attaching the plates to the respective shoes for constraining substantial longitudinal movement and providing for lateral shifting movement of the plates with respect to the shoes whereby the plates transmit forward stepping movements to the shoes and are movable transversely with respect to the latter in response to stresses exerted laterally of the mechanisms during the portion of a walking cycle that the shoes are in immobile machine supporting position.

26. Walking apparatus for an excavating machine comprising crank arm mechanisms on opposite sides of the machine, shoes operable thereby, load distributing plate members each secured to one of said mechanisms and interposed between the same and the top surface of the respective shoe for distributing imposed loads on the latter, and means attaching the plate members to the respective shoes for constraining substantial relative longitudinal movement of the plates with respect to the shoes and for transmitting forward stepping movements of the mechanisms to the shoes and enabling the mechanisms to move transversely with respect to the shoes in response to stresses exerted laterally on the mechanisms while the shoes are in immobile machine supporting position.

27. In a self-propelled machine comprising a base, a platform on said base, elongate treads at the respective sides of said platform, operating devices to move said treads forwardly with relation to said platform and said base into engagement with the ground and to then move said platform and said base forwardly with relation to the treads, and rotatable means on said platform for actuating said operating devices; a connecting device mounted on each tread for lateral movement with relation thereto and held against vertical movement with relation to said tread, and means for pivotally connecting each operating device with one of said connecting devices and for maintaining the axis of said pivotal connection parallel with the axis of the rotatable means on said platform in all operative positions of said connecting device with relation to said tread.

28. In a self-propelled machine comprising a base, a platform on said base, elongate treads at the respective sides of said platform, operating devices to move said treads forwardly with relation to said platform and said base into engagement with the ground and to then move said platform and said base forwardly with relation to the treads, and rotatable means on said platform including wrist pins on which the respective operating devices are mounted; a connecting device mounted on each tread for movement with relation thereto about a vertical axis and held against vertical movement with relation to said tread, and means for pivotally connecting each operating device with one of said connecting devices on a transverse axis spaced from the vertical axis of said connecting device and for maintaining said transverse axis parallel with the axis of the wrist pin on which said operating device is mounted in all operative positions of said connecting device with relation to said tread.

29. In a self-propelled machine comprising a base, a platform on said base, elongate treads at the respective sides of said platform, operating devices to move said treads forwardly with relation to said platform and said base into engagement with the ground and to then move said platform and said base forwardly with relation to the treads, and rotatable means on said platform including wrist pins on which the respective operating devices are mounted; a connecting device mounted on each tread for movement with relation thereto about a vertical axis and held against vertical movement with relation to said tread, a trunnion member mounted on each connecting device for movement about an axis extending lengthwise of the latter, and means for pivotally connecting each operating device with one of said trunnion members on an axis at right angles to said trunnion member and for maintaining said transverse axis parallel with the axis of the wrist pin on which said operating device is mounted in all operative positions of said connecting device with relation to said tread.

30. In a self-propelled machine comprising a supporting structure, treads at the opposite sides of said structure, operating devices for said treads carried by said structure, and means on said structure for actuating said operating devices and said treads to advance said structure step by step; an elongate member mounted on the upper surface of each tread for lateral movement with relation thereto and connected adjacent its ends with said tread to cause the latter to be moved upwardly and forwardly thereby, and means for operatively connecting the adjacent operating device with said member between the ends thereof.

31. In a self-propelled machine comprising a supporting structure, treads at the opposite sides of said structure, operating devices for said treads carried by said structure, and means on said structure for actuating said operating device and said treads to advance said structure step by step; an elongate member mounted on each tread for lateral movement with relation thereto and connected adjacent its ends with said tread to cause the latter to be moved upwardly and forwardly thereby, means between the ends of said connecting member for connecting the same with the adjacent operating device for movement with relation thereto about an axis transverse to said member and for preventing the relative movement of said member and said operating device about a vertical axis.

32. In a self-propelled machine comprising a supporting structure, treads on the opposite sides of said structure, driving mechanism on said structure, rigid operating devices on the respective sides of said structure and operatively connected with and supported by said driving mechanism for advancing said treads step by step, a member connected with the lower portion of each operating device for upward and forward movement thereby and arranged to bear on the upper surface of the adjacent tread, and means for connecting said member with said tread for lateral movement with relation thereto and for causing said tread to move upwardly and forwardly with said member.

33. A propelling unit for a walking tractor comprising a tread, a member arranged to bear on the upper surface of said tread and having means whereby it may be operatively connected with driving mechanism on said tractor, and means connecting said tread to said member for upward and forward movement thereby and providing for a limited lateral movement of said member with relation to said tread.

34. A supporting unit for a walking tractor comprising a tread, a member mounted on said tread for movement about a substantially vertical axis with relation thereto, held against substantial vertical movement with relation to said tread and having means spaced from said axis whereby it may be operatively connected with driving mechanism on said tractor.

35. A propelling unit for a walking tractor comprising a tread, a member extending lengthwise of said tread, connected adjacent one end thereof with said tread for movement about a substantially vertical axis with relation to said tread and having between its ends means whereby it may be operatively connected with driving mechanism on said tractor, and a device secured to said tread and having a part overhanging the other end of said member to prevent substantial vertical movement of the latter.

36. In a self-propelled machine comprising a base, a platform on said base, treads at the respective sides of said platform, operating devices to move said treads forwardly with relation to said platform and said base into engagement with the ground and to then move said platform and said base upwardly and forwardly with relation to said treads, each operating device including a movable rigid member, means on said platform for actuating said operating devices, and means for connecting the lower portion of each rigid member with the corresponding tread for lateral movement with relation thereto and for pivotal movement about an axis transverse to said tread.

37. In a self-propelled machine comprising a base, a platform on said base, treads at the respective sides of said platform, operating devices to move said treads forwardly with relation to said platform and said base into engagement with the ground and to then move said platform and said base upwardly and forwardly with relation to said treads, and means on said platform for actuating said operating devices, a connecting member mounted on each tread for lateral movement with relation thereto and held against substantial vertical movement with relation thereto, and means for pivotally connecting said member with one of said operating devices and for holding said member against movement about a vertical axis with relation to said operating device.

ELLIS C. WILSON.
HARRY F. STOCK.
GLEN B. HEFFELFINGER.